S. A. SWANSON.
WEEDER ATTACHMENT FOR CULTIVATORS.
APPLICATION FILED JAN. 16, 1909.
965,961.
Patented Aug. 2, 1910.
2 SHEETS—SHEET 1.
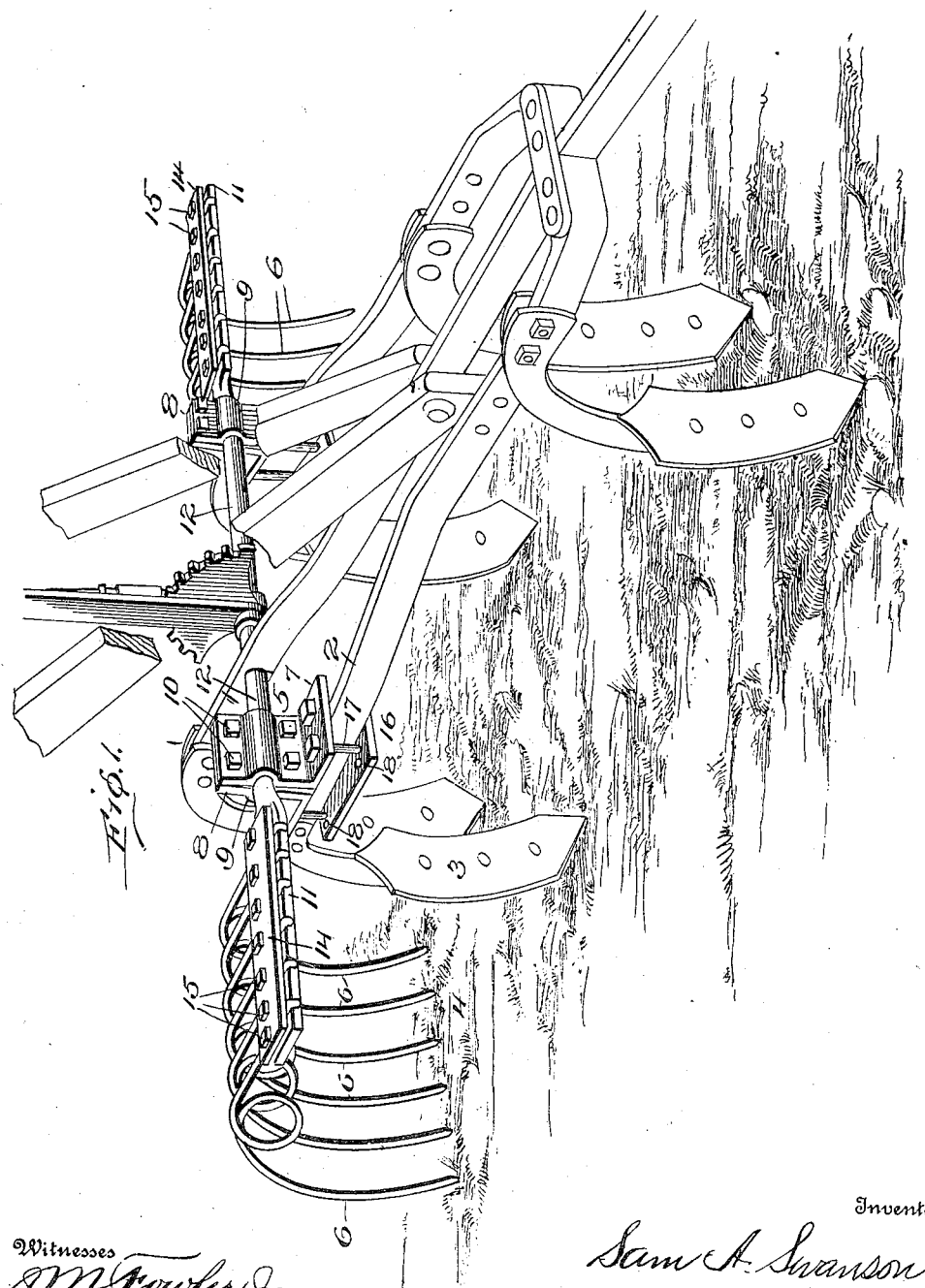

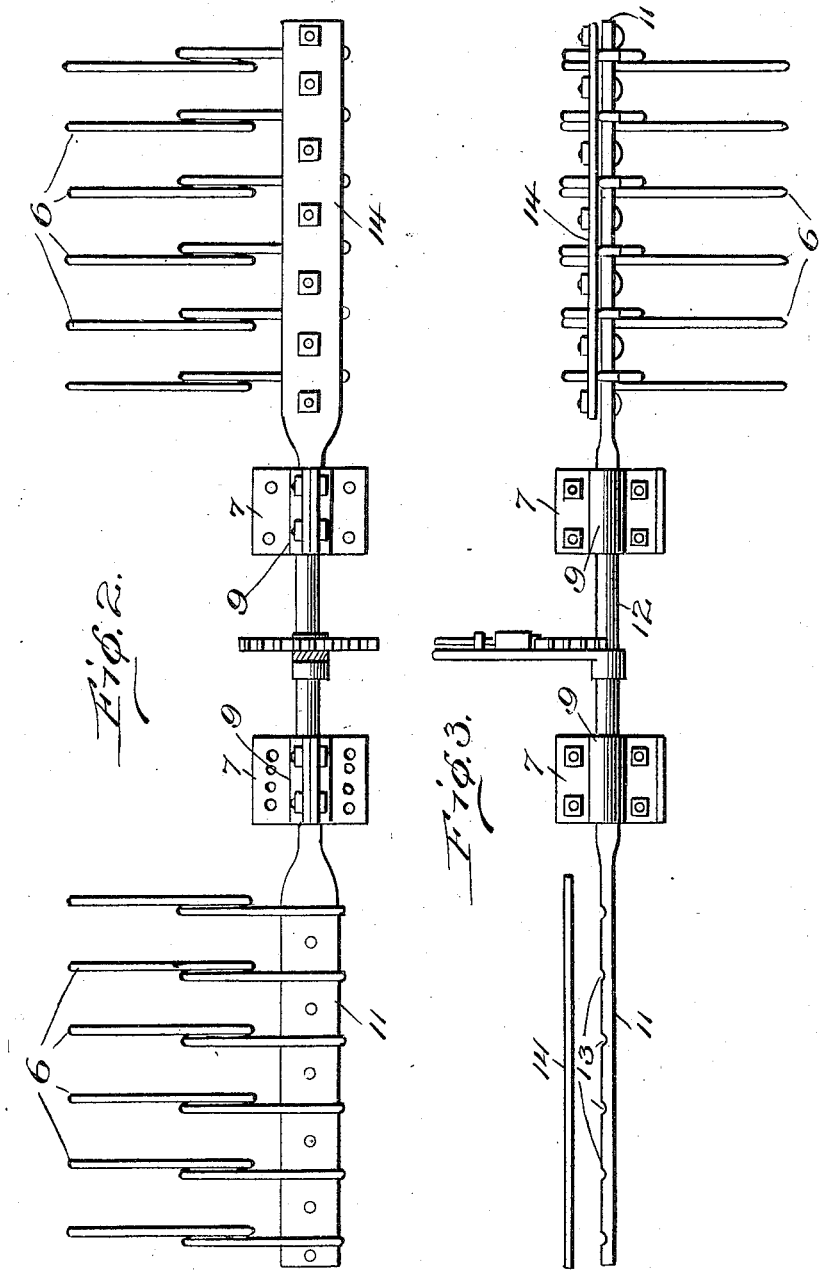

UNITED STATES PATENT OFFICE.

SAM A. SWANSON, OF FARMINGTON, WISCONSIN.

WEEDER ATTACHMENT FOR CULTIVATORS.

965,961.  Specification of Letters Patent.  Patented Aug. 2, 1910.

Application filed January 16, 1909. Serial No. 472,662.

*To all whom it may concern:*

Be it known that I, SAM A. SWANSON, citizen of the United States, residing at town of Farmington, in the county of Waupaca and State of Wisconsin, have invented certain new and useful Improvements in Weeder Attachments for Cultivators, of which the following is a specification.

My invention relates to a weeder attachment for cultivators, and consists essentially of a series of spring fingers adapted to ride the row of growing plants, means of adjustment of the same relative to the row and the cultivator and means for clamping the device to the frame of the cultivator.

My invention further consists of a finger supporting bar having a lateral adjustment and revoluble adjustment within a socket supported by the cultivator-frame.

My invention further consists in a finger clamping device, adapted to retain the fingers in alinement with each other at determined distances.

In the accompanying drawing, Figure 1 is a perspective view of my invention in attachment with the cultivator-frame; Fig. 2 is a plan view of the attachment and Fig. 3 is a detail view of the finger-clamp.

Referring to the drawing by numerals: 2 represents a portion of the cultivator-frame to which my invention is clamped by the clamp 5; 3 represents one of the cultivator shovels.

My invention is especially adapted to plants that are planted and cultivated in rows or squares, such as potatoes and corn, and is intended to be used when the plants are young. The spring-fingers 6, 6, 6, etc., are adapted to be adjustable relative to the row and to scratch the ground slightly, pulling up and destroying the smaller weeds while the larger plant tops pass between the fingers and are not disturbed.

My invention also provides a means of cultivation of the plants close to the roots and of leveling the furrow thrown toward the plants by the cultivator shovel.

It is intended that a weeder be attached upon each side of the cultivator. By this means, upon the return of the cultivator in the adjoining row, the opposite weeder attachment again scratches the same ground the second time, thus affording a second weeding and cultivation to each row and, in cultivating squares, the cross cultivation again doubles the weeding operation and root cultivation.

In the use of my invention, complete and accurate adjustment of the weeder-fingers relative to the row is necessary. I provide three means of adjustment. The top plates 7, 7, of the clamp 5 are integral with the uprights 8, 8, which are curved or recessed near the center at 9 to form a laterally extending socket. The uprights 8, 8 are cross-bolted above and below the socket 9 by the bolts 10. The finger-bar 11 is integral with the rod 12 and the rod 12 is adapted to revolve and also to slide laterally in the socket 9. The top bolts 10, 10 may be loosened so that these adjustments may be effected and then the bolts may be tightened to retain the adjustment. The finger-bar 11 is provided with recesses 13, which receive the fingers 6, near the top end. The fingers may be adjusted laterally in these recesses before being secured in position by tightening the bar 14 by means of the bolts 15. If desiring to increase the distance between the fingers they may be inserted only in each alternate recess. The bottom plate 16 of the clamp 5 is provided with a series of holes 18, adapted to receive the bolts 17, 17, which pass through the top plates 7, 7 on each side. By this means, the clamp may be adjusted to any ordinary cultivator-frame. The bolts 17, 17 may be passed downwardly through the desired holes in the plates 7, 7 on each side and through the proper holes in the bottom plate and secured by nuts beneath, it being intended that the bolts shall be secured upon each side of the frame 2.

Having thus described my invention, what I claim is—

In a device of the class described, the combination with a cultivator having laterally adjustable beams, of brackets erected upon such adjustable beams, a shaft journaled in the bearings and extending upon opposite sides of such beams, means carried by the cultivator structure adapted to move the shaft rotatably, said shaft being provided with flattened extremities, earth-engaging fingers disposed upon the flattened extremities, keepers disposed upon the fingers, and means to clamp the fingers rigidly between the keepers and flattened extremities.

In testimony whereof I affix my signature, in presence of two witnesses.

SAM A. SWANSON.

Witnesses:
  A. R. WATERHOUSE,
  M. H. O'BRIEN.